US007088901B2

(12) United States Patent
Kim et al.

(10) Patent No.: US 7,088,901 B2
(45) Date of Patent: Aug. 8, 2006

(54) LIGHT GUIDE APPARATUS AND METHOD FOR A DETECTOR ARRAY

(76) Inventors: Chang L. Kim, 1813 Kensington Dr. #3, Waukesha, WI (US) 53188; David L. McDaniel, w316 Northey Rd., Douaman, WI (US) 53118

( * ) Notice: Subject to any disclaimer, the term of this patent is extended or adjusted under 35 U.S.C. 154(b) by 132 days.

(21) Appl. No.: 10/635,531

(22) Filed: Aug. 7, 2003

(65) Prior Publication Data
US 2005/0031293 A1   Feb. 10, 2005

(51) Int. Cl.
*G02B 6/10* (2006.01)
(52) U.S. Cl. .................. 385/146; 250/363.3; 250/366; 250/367; 250/368
(58) Field of Classification Search ........ 250/366–368, 250/363.03; 385/146

See application file for complete search history.

(56) References Cited

U.S. PATENT DOCUMENTS

| 4,733,083 A | | 3/1988 | Wong |
| 4,743,764 A | | 5/1988 | Casey et al. |
| 4,749,863 A | * | 6/1988 | Casey et al. ............ 250/363.03 |
| 5,091,650 A | | 2/1992 | Uchida et al. |
| 5,210,420 A | * | 5/1993 | Hartz et al. ............ 250/363.03 |
| 5,227,634 A | | 7/1993 | Ryuo et al. |
| 5,300,782 A | | 4/1994 | Johnston et al. |
| 6,087,663 A | * | 7/2000 | Moisan et al. .............. 250/367 |

OTHER PUBLICATIONS

H.Uchida, et al., "Design of a mosaic BGO detector system for positron CT", IEEE Trans Nuclear Science, 33(1), pp. 464-467 (Feb. 1987).*
Photomultiplier Tubes Product Specification, Photonis XP1452 (abstract), Mar. 29, 2001 (3 pages).
"High Spatial Resolution Detector Using and 8×8 MLS Crystal Array and a Quad Anode Photo-Multiplier." by Chang L. Kim and David McDaniel, 1 page poster presented Nov. 15, 2002 at the 2002 IEEE Nuclear Science Symposium and Medical Imaging Conference, Norfolk, VA.
"Design of a Mosaic BGO Detector System for Positron CT," by Uchida et al., IEEE Transactions on Nuclear Science, vol. 33, No. 1 Feb. 1986 ( 4 pages).
"Figures of Merit for Different Detector Configurations Utilized in High Positron Cameras," by Eriksson et al., IEEE Transactions on Nuclear Science, vol. 33, No. 1, pp. 446-451, (Feb. 1986).

(Continued)

*Primary Examiner*—Leonidas Boutsikaris

(57) ABSTRACT

According to one aspect, the invention relates to a light guide which may include a first surface which receives light, a second surface which emits light, wherein the second surface is parallel to the first surface and the second surface has a smaller area than the first surface, at least one edge surface which extends between the first surface and the second surface, and a light barrier which extends between the first surface and the second surface, wherein the light barrier divides the light guide into separate regions and reduces the propagation of light between the separate regions. The light guide can be used in a positron emission tomography scanner.

22 Claims, 10 Drawing Sheets

OTHER PUBLICATIONS

"High Spatial Resolution Detector Using and 8×8 MLS Crystal Array and a Quad Anode Photo-Multiplier," by Chang L. Kim and David McDaniel (5 pages), distributed May, 2003 by IEEE to attendees of the Nov. 2002 IEEE Nuclear Sciences Symposium and Medical Imaging Conference, Norfolk, VA.

Wai-Hoi Wong, "A Positron Camera Detector Design with Cross-Coupled Scintillators and Quadrant Sharing Photomulipliers," IEEE Transactions on Nuclear Science, vol. 40, No. 4, pp. 962-966, (Aug. 1993).

Catherine M. Pepin, "Comparison of LSO, LGSO and MLS Scintillators," IEEE Nuclear Science Symposium, vol. 1, pp. 124-128, San Diego, Ca (Nov. 2001).

M.E Casey and R. Nutt, "A Multicrystal Two Dimensional BGO Detector System for Positron Emission Tomography,"IEEE Transactions on Nuclear Science, vol. 33, No. 1, Feb. 1986, p. 460-463.

* cited by examiner

LIGHT GUIDE APPARATUS AND METHOD FOR A DETECTOR ARRAY

BACKGROUND

The present invention relates generally to imaging devices, and more particularly to a light guide for an array of detectors in an imaging device.

In certain types of imaging devices, such as positron emission tomography (PET) scanners, arrays of detector elements serve the function of detecting radiation emanating from the patient. In a PET scanner, for example, arrays of scintillator crystals detect gamma rays which are generated inside the patient. The gamma rays are produced when a positron emitted from a radiopharmaceutical injected into the patient collides with an electron causing an annihilation event. The scintillator crystals receive the gamma rays and generate photons in response to the gamma rays.

One of the challenges in designing a high resolution PET scanner relates to the space requirements of the electronics associated with the detector crystals, in particular the photomultiplier tubes (PMTs) which are situated behind the detector crystals. The function of the photomultiplier tubes is to receive photons produced by the scintillator crystals and to generate an analog signal with a magnitude representative of the number of photons received. The photomultiplier tubes typically cannot be diminished in size beyond a certain point, so that generally each photomultiplier tube is situated behind a number of smaller detector crystals. For example, a detector module in a PET scanner may comprise a 2×2 array of photomultiplier tubes situated behind a 6×6 array of scintillator crystals. In response to a scintillation event, each PMT produces an analog signal which is representative of the number of photons it has received. The relative magnitudes of the four PMT signals are then used to determine where the scintillation event took place and which crystal detected the event.

In determining the location of the scintillation event, it is generally advantageous to have a high degree of separation of the relative signal levels arising from each of the individual scintillation crystals in the detector array. Various arrangements have been proposed for increasing the spatial resolution of the detector crystals by controlling the light distribution within the detector array. For example the light distribution within the array of detector crystals can be controlled by applying various surface finishes having known light scattering and reflective properties to each crystal. These arrangements generally attempt to control the light distribution such that the proportion of light reaching each photomultiplier tube is relatively consistent and well defined for each event occurring at a particular detector crystal. In this way, the analog signals from the photomultiplier tubes may consistently determine which detector crystal produced the scintillation event.

As the demands for higher resolution in PET scanners continue to increase, one approach to achieving higher resolution is to increase the number of crystals in each detector array without increasing the size of the array. For example, a 6×6 array of detector crystals might be replaced with an 8×8 array. However, an increase in the number of crystals may introduce additional complexities and costs to the surface finishes and optical coupling which may be necessary for acceptable spatial resolution of the scintillation events. An increased number of smaller crystals may also introduce additional challenges with respect to light loss in the corner crystals and the tolerances for mechanical alignment of the array with respect to the photomultiplier tubes. The present invention provides an apparatus and method which can overcome these problems.

SUMMARY

According to one embodiment, the invention relates to a light guide comprising a first surface which receives light, a second surface which emits light, wherein the second surface is parallel to the first surface and the second surface has a smaller area than the first surface, at least one edge surface which extends between the first surface and the second surface, and a light barrier which extends between the first surface and the second surface, wherein the light barrier divides the light guide into separate regions and reduces the propagation of light between the separate regions.

According to another embodiment, the invention relates to a method of making a detector comprising the steps of assembling a plurality of detector crystals into an array, and optically coupling the detector crystals to a light guide, wherein the light guide comprises a first surface which receives light, a second surface which emits light, wherein the second surface is parallel to the first surface and the second surface has a smaller area than the first surface, at least one edge surface which extends between the first surface and the second surface, and a light barrier which extends between the first surface and the second surface, wherein the light barrier divides the light guide into separate regions and reduces the propagation of light between the separate regions.

DETAILED DESCRIPTION

The general operation of an example of a PET scanner will be described, followed by a description of an exemplary embodiment of a light guide which provides a desired light distribution for the light generated by the detector crystals in the scanner.

Figure 1:
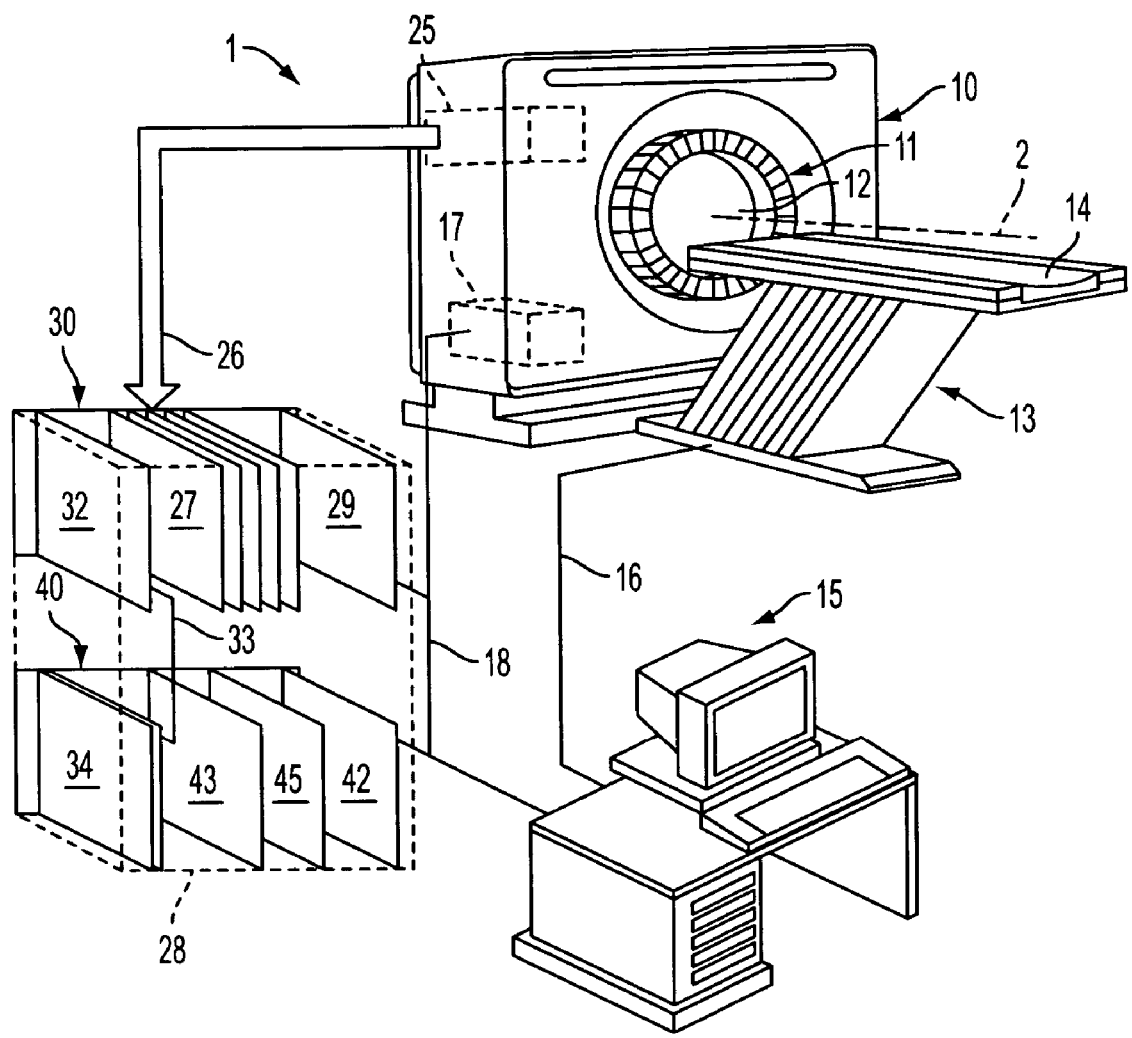
FIG. 1 is a drawing of an imaging system according an exemplary embodiment of the invention.

FIG. 1 illustrates a PET scanner 1 which includes a gantry 10 supporting a detector ring assembly 11 about a central opening or bore 12. The detector ring assembly 11 is circular in shape and is made up of multiple detector rings (not shown) that are spaced along a central axis 2 to form a cylindrical detector ring assembly. According to one embodiment, the detector ring assembly 11 includes 32 detector rings spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

Figure 2:
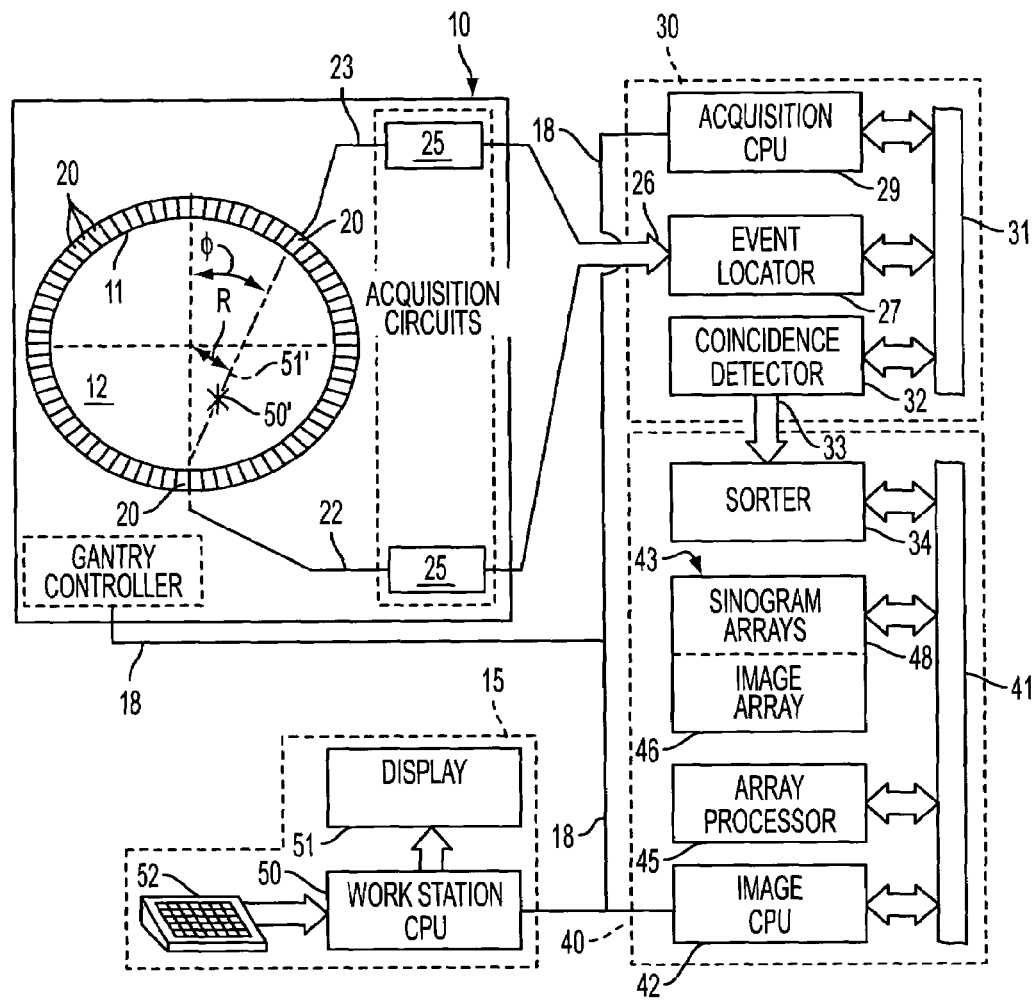
FIG. 2 is a schematic diagram of the imaging system of FIG. 1.

As shown in FIG. 2, the operator work station 15 includes a central processing unit (CPU) 50, a display 51 and a keyboard 52. Through the keyboard 52 and associated control panel switches, the operator can control the calibration of the PET scanner, its configuration, and the positioning of the patient table for a scan. Similarly, the operator can control the display of the resulting image on the display 51 and perform image enhancement functions using programs executed by the work station CPU 50.

Figure 3:
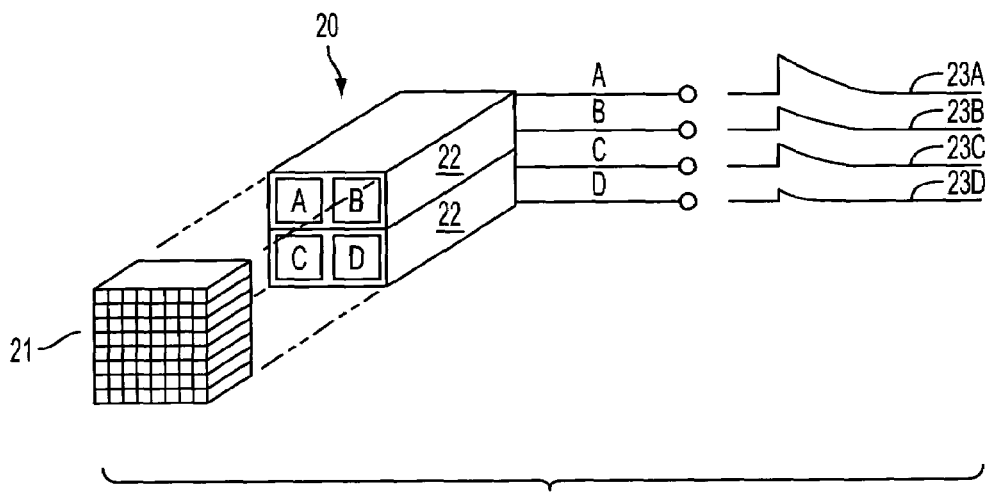
FIG. 3 is a drawing of an example of a detector module which forms part of the imaging system of FIG. 1.
Figure 4:
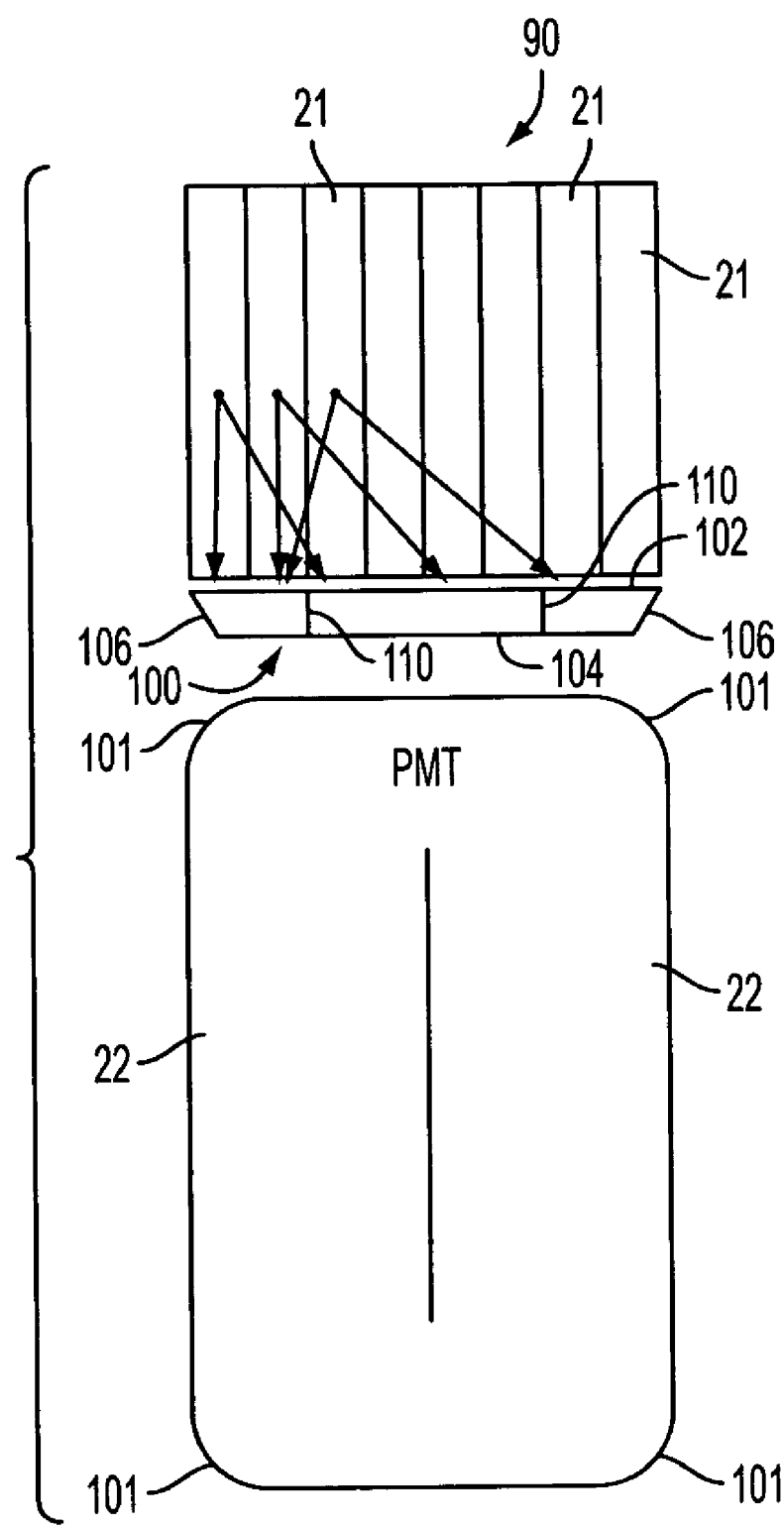
FIG. 4 is a drawing of an 8×8 array of detector crystals, a light guide, and an array of photomultipliers according to an exemplary embodiment of the invention.

The detector ring assembly 11 is comprised of a number of detector modules. According to one embodiment, the detector ring assembly 11 comprises 36 detector modules, where each detector module comprises eight detector blocks. An example of one detector block 20 is shown in FIG. 3. The eight detector blocks 20 in a detector module can be arranged in a 2×4 configuration such that the circumference of the detector ring assembly 11 is 72 detector blocks around, and the width of the detector ring 11 assembly is 4 detector blocks wide. Each detector block 20 comprises a number of individual detector crystals. For example, as shown in FIG. 4, each detector block 20 may comprise an 8×8 matrix of 64 detector crystals 21. The detector ring assembly 11 would thus have 32 detector rings. Each ring would have 576 detector crystals. According to one embodiment, each of the detector crystals has dimensions of 4.7× 4.7×30 millimeters (mm$^3$). In this case, the dimensions of the array of detector crystals are 38×38×30 mm$^3$. The detector block 20 may also comprise a 6×6 array or other arrangement of detector crystals 21, according to other embodiments. The array of detector crystals 21 is situated in front of four photomultipliers 22. The four photomultipliers 22 may take the form of four photomultiplier tubes or a quad anode photomultiplier tube, for example. Of course, the above-described configurations of detector crystals and modules are merely examples. Other configurations, sizes, and numbers of detector crystals and detector modules can be used, as will be appreciated by those skilled in the art.

During a PET scan, a gamma ray is incident upon one of the detector crystals 21. The detector crystal 21, which may be formed of mixed lutetium silicate (MLS) or bismuth germanate (BGO), for example, converts the gamma ray into a number of photons which are received and detected by the photomultipliers. The photons generated by a detector crystal 21 generally spread out to a certain extent and travel into adjacent detector crystals such that each of the four photomultipliers 22 receives a certain number of photons as a result of a gamma ray hitting a single detector crystal 21. For example, FIG. 4 shows three examples of scintillation events where the generated photons travel from the generating detector crystal 21 through adjacent detector crystals and into a number of photomultipliers 22.

In response to a scintillation event, each photomulplier 22 produces an analog signal 23A–23D on one of the lines A–D, as shown in FIG. 3, which rises sharply when a scintillation event occurs and then tails off exponentially. The relative magnitudes of the analog signals are determined by the position in the 8×8 detector crystal array at which the scintillation event took place. The energy of the gamma ray which caused the scintillation event determines the total magnitude of these four signals.

As shown in FIG. 2, a set of acquisition circuits 25 is mounted within the gantry 10 to receive the four signals from the detector block 20. The acquisition circuits 25 determine the event coordinates within the array of detector crystals by comparing the relative signal strengths as follows:

x=(A+C)/(A+B+C+D)
z=(A+B)/(A+B+C+D)

These coordinates (x, z), along with the sum of all four signals (A+B+C+D) are then digitized and sent through a cable 26 to an event locater circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPU 29 which controls communications on the local area network 18 and a bus 31. The event locator circuits 27 assemble the information regarding each valid event into a set of digital numbers that indicate when the event took place and the identity of the detector crystal 21 which detected the event. The event locator circuits 27 use a detector position map to map the pair of coordinates (x, z) to the detector 21 which detected the event. The detector position map is a two dimensional look-up table that maps a singles event coordinate position (x, z) to a crystal ID number.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. First, the time markers in each event data packet must be within a specified time period of each other, e.g., 12.5 nanoseconds, and second, the locations indicated by the two event data packets must lie on a straight line which passes through the field of view (FOV) in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital numbers that precisely identify the locations of the two detector crystals 21 that detected the event. For a detailed description of an example of a coincidence detector 32, reference is made to U.S. Pat. No. 5,241,181 entitled "Coincidence Detector For A PET Scanner."

The sorter 34, which may comprise a CPU and which forms part of an image reconstruction processor 40, receives the coincidence data packets from the coincidence detector 32. The function of the sorter 34 is to receive the coincidence data packets and generate from them memory addresses for the efficient storage of the coincidence data. The set of all projection rays that point in the same direction (θ) and pass through the scanner's field of view is a complete projection, or "view." The distance (R) between a particular projection ray and the center of the field of view locates that projection ray within the view. As shown in FIG. 2, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the two detector crystals 21 lying on this projection ray. During an emission scan, the coincidence counts are organized in memory 43, for example as a set of two-dimensional arrays, one for each axial image, and each having as one of its dimensions the projection angle θ and the other dimension the distance R. This θ by R map of the measured events may be referred to as a sinogram array 48. The sorter 34 may also organize the coincidence events into other data formats, such as the projection plane format described in U.S. Pat. No. 6,462,342. In the projection plane format, other variables are used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sinogram array element. At the completion of the emission scan, the sinogram array 48 stores the total number of annihilation events which occurred along each ray. The array processor 45 reconstructs an image from the data in the sinogram array 48. First, however, a number of corrections are made to the acquired data to correct for measurement errors such as those caused by attenuation of the gamma rays by the patient, detector gain nonuniformities, random coincidences, and integrator dead time. Each row of the corrected sinogram array is then Fourier transformed by the array processor 45 and multiplied by a one-dimensional filter array. The filtered data is then inverse Fourier transformed, and each array element is back projected to form the image array 46. The image CPU 42 may either store the image array data on disk or tape (not shown) or output it to the operator work station 15.

A detector array and light guide will now be described according to an exemplary embodiment of the invention.

Referring again to FIG. 4, an 8×8 array 90 of detector crystals 21 is shown along with a light guide 100 and four photomultipliers 22 which may take the form of four photomultiplier tubes or a quad anode photomultiplier tube, for example. In general, a photomultiplier comprises a photocathode layer and multiple layers of dynodes followed by an anode connected to one output signal cable. The photocathode layer converts a light photon to a photo-electron. This photo-electron signal is magnified as it passes through multiple layers of dynodes having high electric fields between each pair of dynodes. A quad photomultiplier tube has a common photocathode layer and a 2×2 array of dynode and anode chains. It comprises four single photomultipliers together in one glass housing and provides four output anode signals. A quad anode photomultiplier tube can provide a simpler physical structure than four identical photomultiplier tubes and is typically less expensive. One example of a quad anode photomultiplier tube which can be used is the XP 1452 Quad Photomultiplier available from Photonis in France.

The light guide 100 is positioned between the array 90 of detector crystals 21 and the photomultipliers 22. The light guide is optically coupled to the array of detectors 21 and the photomultipliers using, for example, an optical glue such as KE420 silicone adhesive available from Shin-Etsu Chemical Co., Ltd. of Tokyo, Japan, or RTV. The refractive indices of the light guide, the glass of the photomultipliers and the glue can be selected to be similar in value to reduce transmission losses. The light guide 100 may be made from an optically transparent material such as plastic or glass which has a long attenuation length for light transmission, for example.

As shown in FIG. 4, the light guide 100 has a first surface 102 which receives photons from the array 90 of scintillator crystals 21 and a second surface 104 which emits photons to the photomultipliers 22. According to one embodiment of the invention, the first surface 102 has a square or rectangular shape and is parallel to the second surface 104 which also has a square or rectangular shape.

The light guide 100 includes at least one, and typically four, edge surfaces 106. The edge surfaces 106 may be beveled to form an acute angle with the first surface 102 and an obtuse angle with the second surface 104, as shown in FIG. 4. Because the edge surfaces 106 slant inwards, the area of the second surface 104 is smaller than the area of the first surface 102. The beveled edge surfaces 106 can reflect light toward the center of the photomultiplier tubes.

Figure 5:
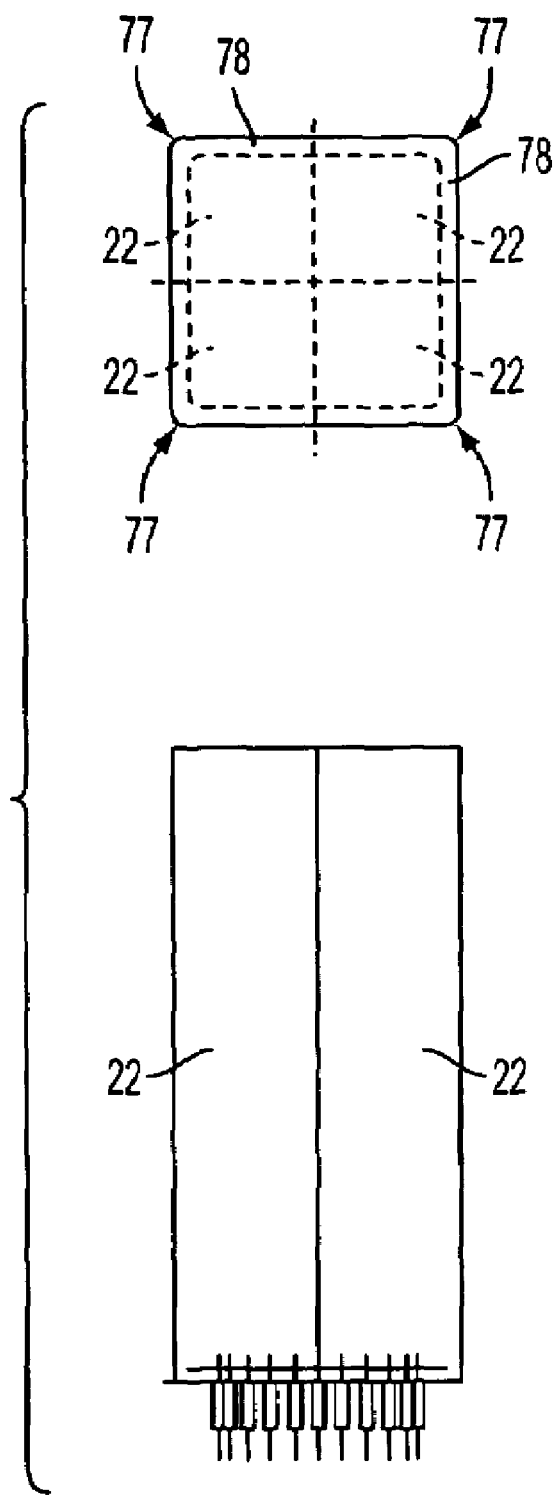
FIG. 5 is a diagram of an example of a photomultiplier tube according to an exemplary embodiment of the invention.

The light guide 100 can provide the advantage of causing more light to reach the photomultipliers 22 than otherwise would. Typically, the emitting area of the array 90 of detector crystals 21 is square or rectangular in shape and is slightly larger than the receiving area of the photomultipliers. For example, the emitting area of the array 90 of detectors may be 38×38 $mm^2$, and the receiving area of a quad photomultiplier may be 37.5×37.5 $mm^2$. The corners of the photomultiplier are typically rounded when viewed from the side and from the top. In FIG. 4, the degree of curvature of the rounded corners 101 when viewed from the side is exaggerated for the purpose of illustration. The corners 101 may have a curvature of 1–2 mm, for example. In addition, when viewed from the top, the shape of the photomultiplier tubes 22 is typically not an exact square. As shown in FIG. 5, the top view of an exemplary quad anode photomultiplier illustrates that the corners 77 are rounded with a curvature of 2–3 mm, for example. Also, the walls 78 have a certain finite thickness, e.g., 1–2 mm, and the photo-cathode of the PMTs 22 typically does not extend to the edge of the PMT. Without a light guide, these factors can prevent a certain amount of scintillation light from the edge crystals 21 from being propagated into the photomultiplier tubes 22, especially when the crystal size is small. For example, for a 6 mm edge crystal and a 2 mm PMT wall thickness, the PMT wall can take up 33% of the emitting area of the edge crystal. If the crystal size is reduced to 4 mm, the 2 mm PMT wall covers 50% of the emitting surface of the crystal. The result can be an increased rate of failure for assembled detectors.

The beveled edge surfaces 106 of the light guide 100 direct the light into the interior of the PMTs 22. The edge surfaces 106 reflect escaping light around the edges and corners of the array 90 back toward the center of the array of photomultipliers 22. The beveled edge surfaces 106 can be made to be reflective, for example by wrapping or coating the edge surfaces 106 with a light reflector. For wrapping, white Teflon tape or aluminum foil can be used. Also, aluminum sputtering or white titanium oxide paint can be used to make a reflective surface. These reflective surfaces can increase the amount of light propagating into the photomultipliers 22.

Another advantage which the beveled edge surfaces 106 can provide is increased tolerance for the positioning of the array 90 of detector crystals with respect to the photomultipliers 22. As the size of the detector crystals 21 is reduced, the alignment between the photomultipliers 22 and the array 90 of detector crystals may become more important, because a small shift in the relative positioning can cause a significant loss in the amount of collected light, particularly for the edge and corner crystals. For example, a small corner crystal may lose a significant amount of light from the array 90 as a result of a small misalignment of the array 90 with respect to the photomultipliers 22. The beveled edge surfaces 106 of the light guide 100, however, can provide more tolerance in aligning the array 90 with the photomultipliers. For example, because the beveled edge surfaces 106 result in a smaller area of the second surface 104, there is more tolerance in positioning the second surface 104 within the receiving area of the photomultipliers. The bevel angle between the edge surfaces 106 and the first surface 102 can be adjusted as desired depending on the shape and size of the photomultipliers 22.

Figure 6:
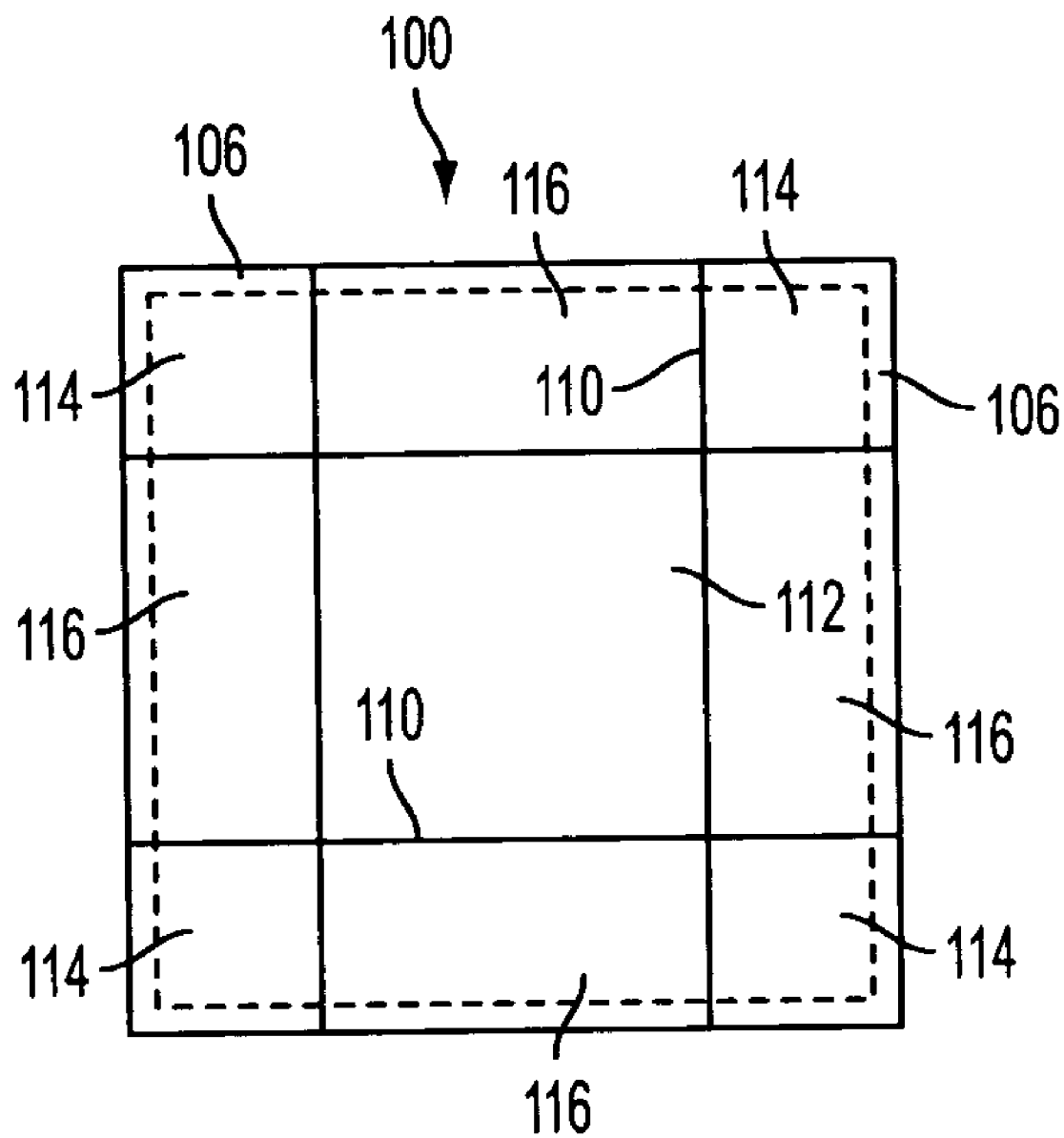
FIG. 6 is a top view of the light guide shown in FIG. 4.

FIG. 6 is a top view of the light guide 100 according to an exemplary embodiment of the invention. As shown in FIG. 6, the light guide 100 may include a light barrier 110. The light barrier 110 can be formed as one or more sections or segments. The light barrier 110 can be formed of any material with a desired reflectivity, such as aluminum foil, Teflon, aluminum sputtering, or white titanium oxide paint, for example. Aluminum sputtering can provide the advantage that it can be applied as a very thin layer. Typically, the light barrier 110 extends the full thickness of the light guide 100 from the first surface 102 to the second surface 104. As shown in FIG. 6, the light barrier 110 may take the form of four segments which divide the light guide 100 into nine regions, including an inner or central region 112, corner regions 114, and side regions 116. These regions can be designed to achieve, together with the array 90 of detector crystals, a desired light distribution output to the photomultipliers 22. The various components of the light guide, including the light barrier 110 and the component blocks of transparent material, can be glued together or attached by other suitable means. According to one exemplary manufacturing method, aluminum sputtering can be applied to long rods having suitable cross section dimensions for the corner pieces 114, lateral pieces 116 and the middle piece 112. After sputtering, the rods are glued together before being cut into slices to make the light guide 100 shown in FIG. 6. After slicing, the tapered edge 106 can be formed for each light guide 100 by machining.

The light guide can increase light sharing in the central region, which can enhance the resolution of the light received by the photomultipliers. The central region 112 of the light guide shown in FIG. 6 can be configured to correspond to a central 4×4 group of crystals in the array 90, for example. The large, continuous central region 112 of the light guide can enhance light sharing in the central region 112, which results in greater resolution between crystals. For example, enhancing light sharing in the central region generally results in more isolated peaks corresponding to the crystals in the central region.

An additional advantage that the light guide 100 can provide is the ability to produce a desired light distribution while reducing the complexity of constructing the array 90 of detector crystals. For example, without the light guide, an increase in light sharing among the central crystals may be achieved by increasing the roughness of the surface finishes of these crystals. Also, without a light guide, it may be necessary to optically glue the surfaces of adjacent middle crystals because the roughened surfaces may not be able to achieve a high enough degree of light sharing. The application of optical glue can be a time consuming and expensive process in manufacturing. These methods for increasing light sharing may become increasingly complex as the number of crystals increases. If the desired degree of light sharing among the central crystals can be achieved using a light guide, then it may be unnecessary to optically glue the central crystals together. Use of the light guide can allow all the crystals in the crystal array simply to be positioned adjacent to one another during manufacturing without gluing. In this case, the air gap between crystals may be about 10 micrometers, for example, because the surface of the crystals may not be perfectly flat.

The thickness of the light guide can also affect the light sharing and can be selected to achieve a desired light sharing. For example, more light sharing among the central crystals can be achieved by increasing the thickness (in the direction of light propagation) of the light guide. According to one embodiment, the thickness of the light guide may be 3–7 mm, for example. Typically, the thickness of the light guide 100 is about 5 mm.

The light guide can also serve the function of redistributing the light generated in the peripheral crystals. As mentioned above, the edge surfaces 106 effectively reduce the area of the emitting surface 104 of the light guide so that light which otherwise might be lost is redirected to a location within the actual receiving area of the photomultipliers 22. For the peripheral crystals, a certain proportion of the outgoing light is reflected by the tapered surface 106 on the light guide 100. It is typically advantageous, however, to inhibit or prevent light from the peripheral crystals and from the reflective edge surface 106 from traveling across the light guide 100 to a photomultiplier situated on the opposite side of the array of photomultipliers. The light guide accordingly may include a light barrier 110 which typically extends for the full thickness of the light guide from the receiving surface 102 to the emitting surface 104. The light barrier 110 embedded in the light guide 100 can be used to reduce or prevent light sharing between edge crystals and middle crystals of the array 90. The light barrier 110 reflects light from crystals located near or at the edge of the array 90 back toward the edge of the photomultiplier 22 and away from the center of the array of photomultipliers 22. In this way, the light barrier 110 redistributes light toward the edges, but still within the effective receiving area of the photomultipliers 22. By maintaining light from the peripheral crystals at the periphery, the light from near-edge crystals can be isolated into a near dynode, which results in an enhancement of the resolution of the peripheral crystals.

The redistribution of the light from the peripheral crystals using the edge surfaces 106 and the light barrier 110 can provide a significant advantage over a crystal array without a light guide where a significant amount of light from the peripheral crystals typically does not reach the PMTs. The light guide 100 can recover light from the corner crystals which otherwise would be lost. By collecting more light, the loss of gamma ray interaction events for edge and corner crystals can be reduced.

Although one example of a light barrier 110 is shown in FIG. 6, the light barrier can be designed in any suitable configuration to control the light distribution within the light guide by reducing or preventing light propagation from one region of the light guide to another region.

Figure 7A:
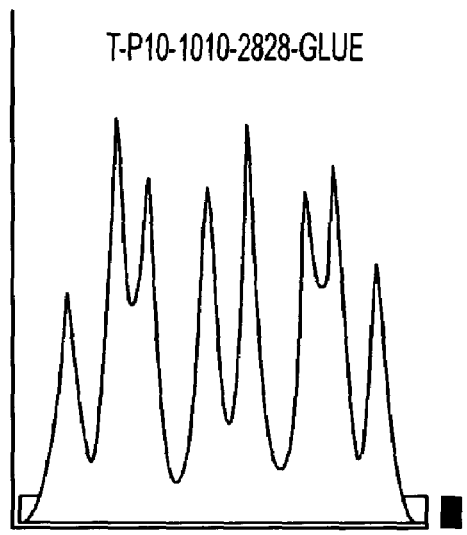
FIGS. 7(a)–(d) are light distribution graphs showing the light distributions for four 1×8 crystal arrays without a light guide.
Figure 7B:
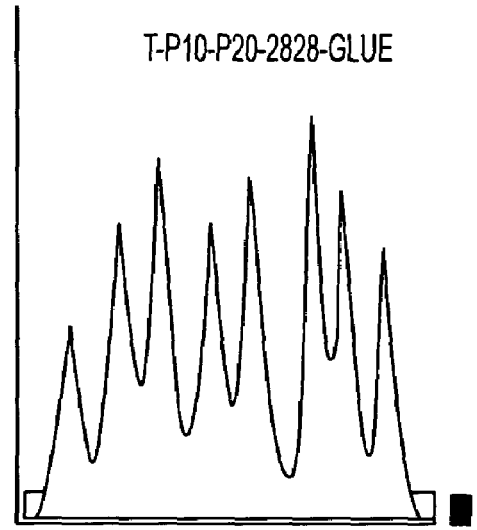
Figure 7C:
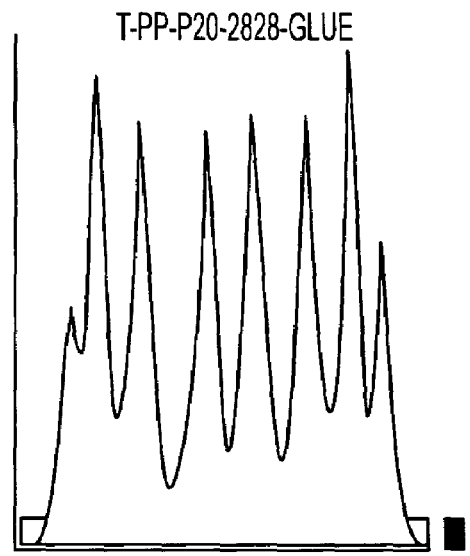
Figure 7D:
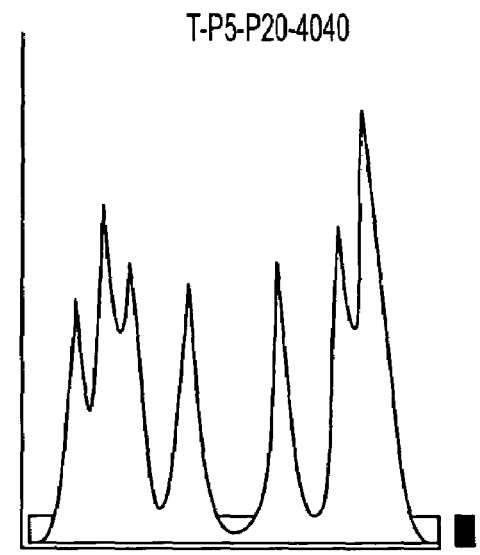
Figure 8A:
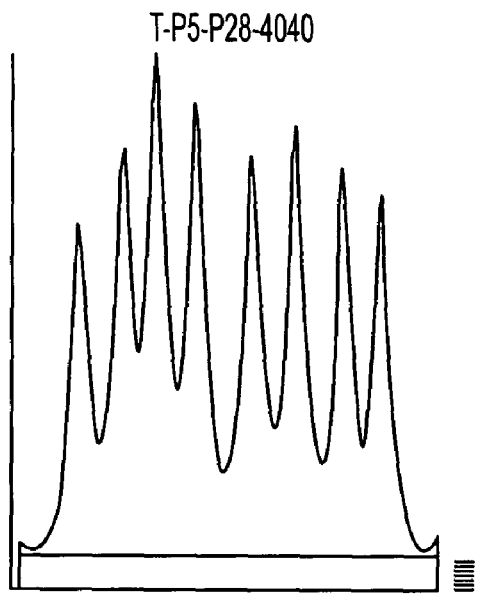
FIGS. 8(a)–(d) are light distribution graphs showing the light distributions for four 1×8 crystal arrays with a light guide according to exemplary embodiments of the invention.
Figure 8B:
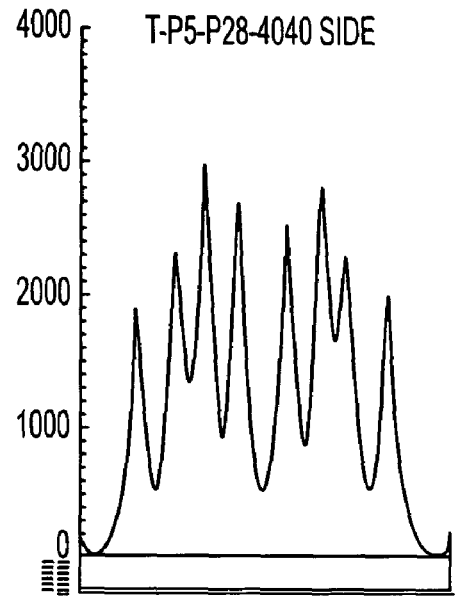
Figure 8C:
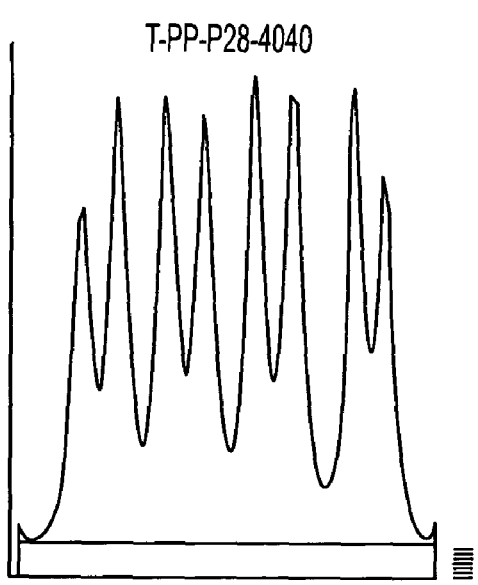
Figure 8D:
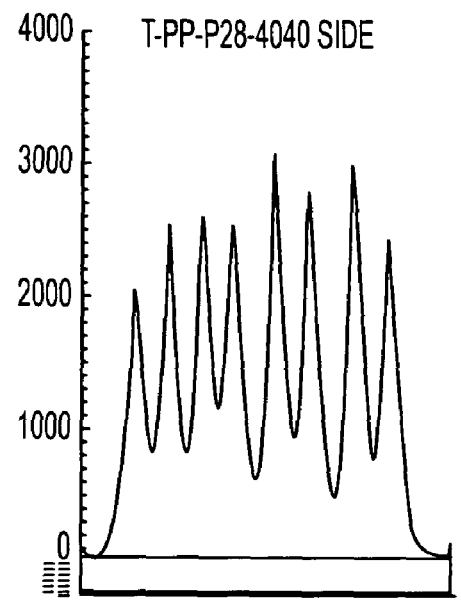

Some advantages of exemplary embodiments of the invention are illustrated in connection with FIGS. 7–10. FIG. 7 shows four examples of light distribution graphs with no light guide in a 1×8 array of detectors. The patterns in FIG. 7 represent the output produced by irradiating the 1×8 array with a uniform source of 511 keV gamma rays ($Ge^{68}$). The notation above each graph represents the surface finish for four of the crystals in the 1×8 array. In FIG. 7, "T" represents Teflon, "P" represents a Polished surface, "10" represents a surface roughness of 10 microns (e.g., due to the surface being lapped with a lapping powder having a 10 micrometer grit size), "28" represents a surface roughness of 28 microns, "40" represents a surface roughness of 40 microns, and "Glue" signifies that the surface is optically coupled to the adjacent crystal surface with optical glue. The Teflon tape may have a thickness of about 70 micrometers, for example. Since the 1×8 array is symmetrical in surface finish, only four of the crystals are specified in the notation. Thus, for example, in FIG. 7(a), the notation "T-P10-1010-2828-Glue" signifies a 1×8 array of crystals where the first crystal is wrapped in Teflon tape, the second crystal has a polished outer surface and an inner surface with a roughness of 10 microns, the third crystal has inner and outer surfaces both with a roughness of 10 microns, the fourth crystal has inner and outer surfaces both with a roughness of 28 microns, and the inner surface of the fourth crystal is optically glued to the inner surface of the fifth crystal. Crystals 5–8 are the mirror image of crystals 1–4. In FIGS. 7(a)–(c), optical glue is used between crystals 4 and 5. In FIG. 7(d), without optical glue, the light distribution is adversely affected in the sense that the eight peaks corresponding to the eight crystals are less isolated and less evenly distributed.

FIGS. 8(a)–(d) show the light distributions for four examples of crystal surface finishes, all with a light guide having a thickness of 5 mm. As indicated in FIGS. 8(a)–(d), although no optical glue is used, the eight peaks corresponding to the eight crystals are readily distinguishable.

Figure 9:
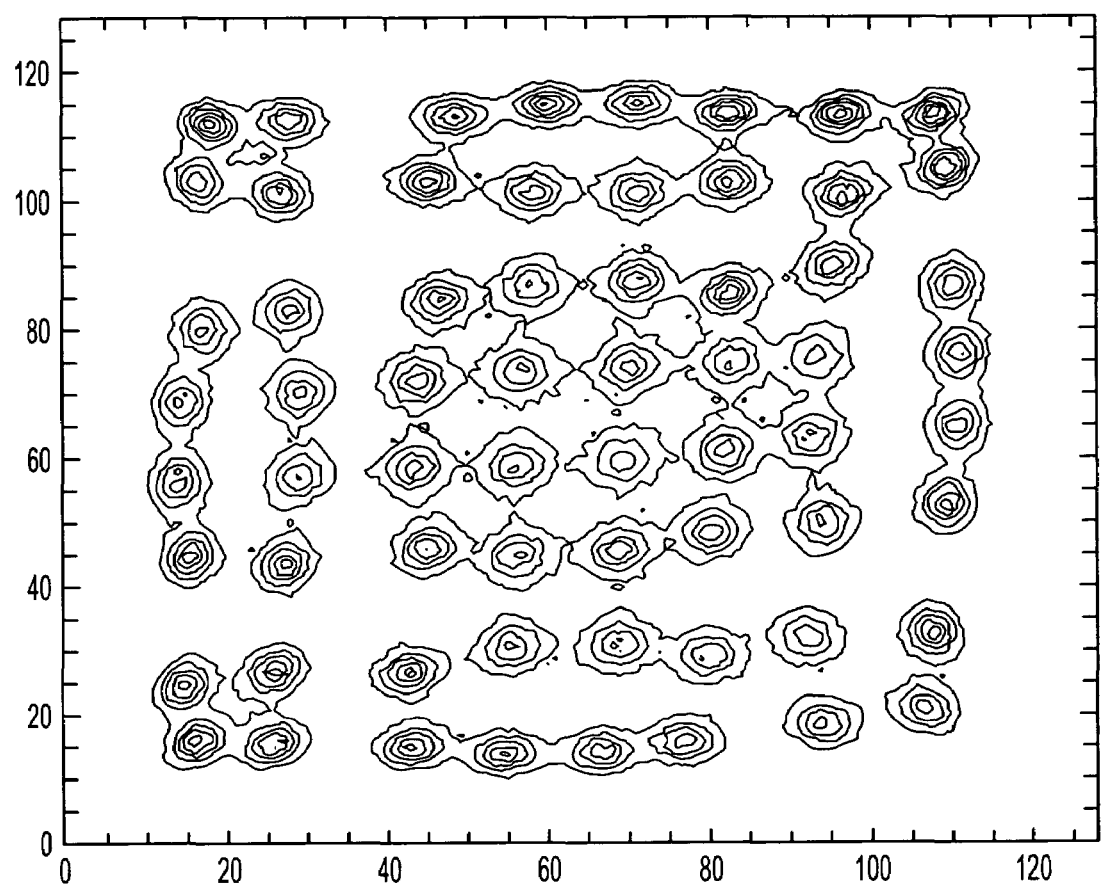
FIG. 9 is a light distribution map for an 8×8 array of detector crystals with a light guide according to an embodiment of the invention.

An example of a light distribution pattern for an 8×8 array of scintillator crystals 21 with a light guide 100 is shown in FIG. 9. The surface finishes for the crystals of FIG. 9 were T-PP-PP-4040. The array of detector crystals was wrapped on the outside with two layers of Teflon tape. The pattern in FIG. 9 represents a light distribution map produced by irradiating the array 90 with a uniform source of gamma rays. As shown in FIG. 9, the distribution of the resulting scintillation events is concentrated in sixty-four localized areas corresponding to the sixty-four detector crystals 21. The corner crystals in the 8×8 block are well-isolated from their neighboring crystals.

Figure 10:
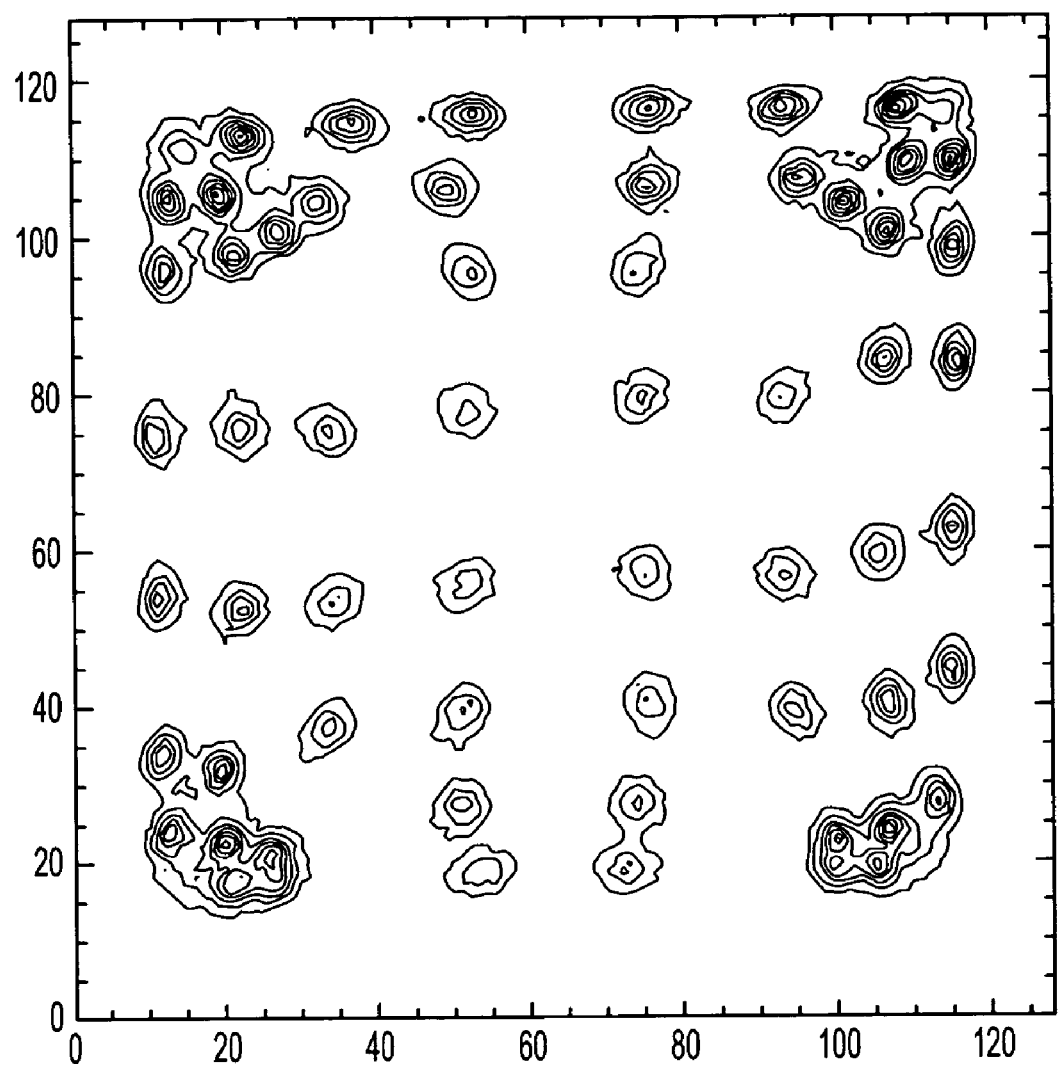
FIG. 10 is a light distribution map for an 8×8 array of detector crystals without a light guide.
Figure 11:
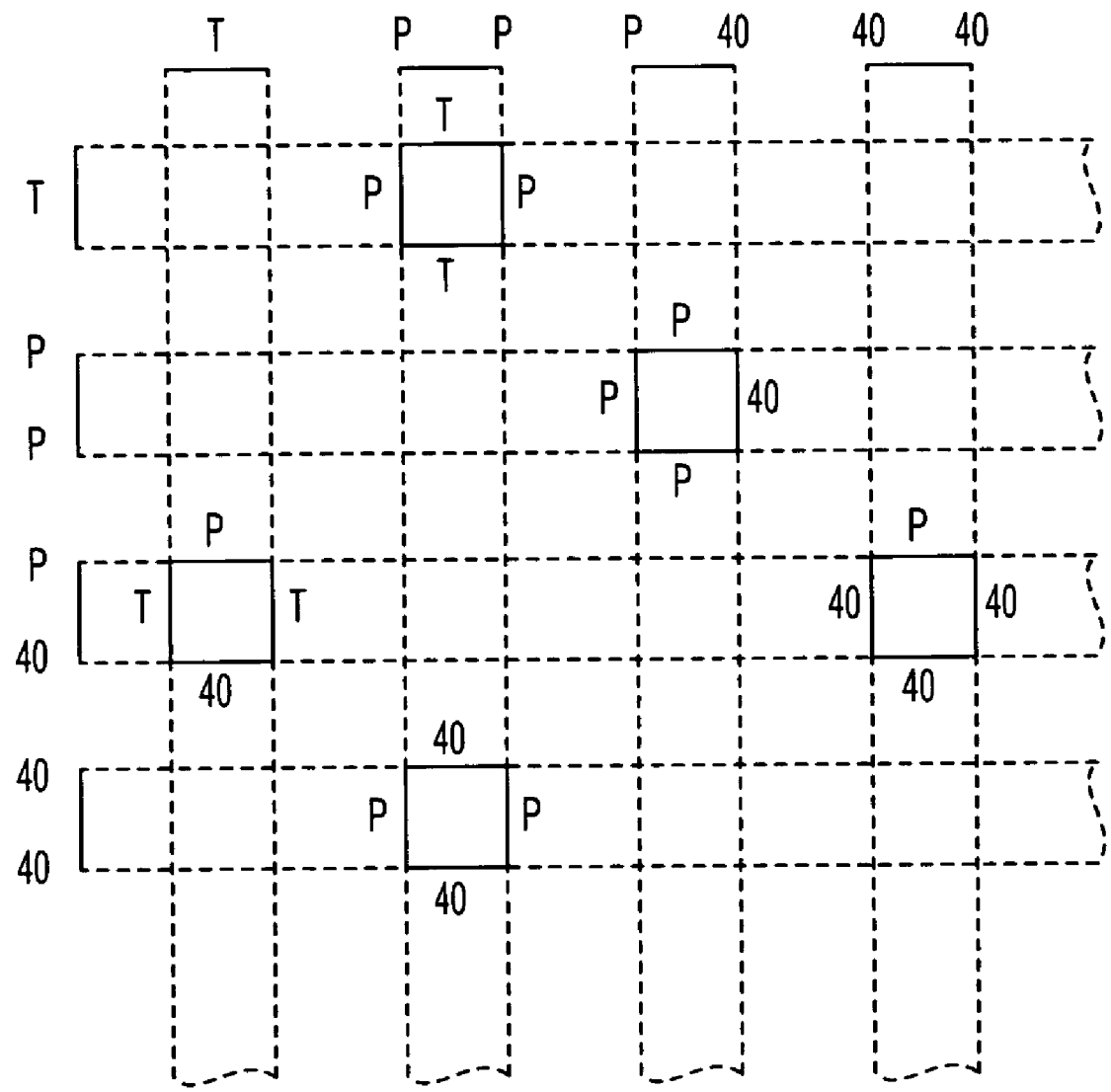
FIG. 11 is an illustration of how the notation format T-PP-P40-4040 applies to the surface finishes in the crystals of a two-dimensional array.

FIG. 9 can be compared to FIG. 10, which is a light distribution map from an 8×8 crystal array of the same overall dimension as the array in FIG. 9, but without a light guide. The surface finishes for the crystals of FIG. 10 were T-PP-P40-4040. FIG. 11 is an illustration of how this notation format applies to the crystals in a two-dimensional array (for clarity, not all of the crystals in the array are shown or labeled in FIG. 11). When there is no light guide, the corner crystals lose light and their positions are shifted toward the center, as shown in FIG. 10. The corner crystals also demonstrate a tendency to merge with their neighboring crystals.

Additional advantages provided by exemplary embodiments of the invention may include better background rejection for the image reconstruction of PET scan data and reduction in the rework or scrap losses associated with bad detector units which would typically be more substantial for a higher-performance detector block.

While the foregoing specification illustrates and describes exemplary embodiments of this invention, it is to be understood that the invention is not limited to the construction disclosed herein. The invention can be embodied in other specific forms without departing from the spirit or essential attributes. Accordingly, reference should be made to the following claims, rather than to the foregoing specification, as indicating the scope of the invention.

What is claimed is:

1. A light guide comprising:
    a first surface which receives light from an array of detector crystals;
    a second surface which emits light, wherein the second surface is parallel to the first surface and the second surface has a smaller area than the first surface;
    at least one edge surface which extends between the first surface and the second surface; and
    a light barrier which extends between the first surface and the second surface, wherein the light barrier divides the light guide into separate regions and reduces the propagation of light between the separate regions;
    wherein the number of separate regions of the light barrier is less than the number of detector crystals of the array.

2. The light guide of claim 1, wherein the at least one edge surface forms an acute angle with the first surface and an obtuse angle with the second surface.

3. The light guide of claim 1, wherein the light barrier comprises Teflon.

4. The light guide of claim 1, wherein the light barrier comprises aluminum.

5. The light guide of claim 1, wherein the light barrier comprises titanium oxide.

6. The light guide of claim 1, wherein
    the at least one edge surface comprises four edge surfaces;
    the first surface has a square shape; and
    the second surface has a square shape.

7. The light guide of claim 1, wherein the separate regions comprise:
    a central region; and
    a plurality of peripheral regions, wherein the central region is larger than each of the plurality of peripheral regions.

8. The light guide of claim 1, wherein the separate regions comprise nine regions, having a central region and a plurality of peripheral regions wherein the central region is larger than each of the plurality of peripheral regions.

9. The light guide of claim 1, wherein the light barrier is in the form of four segments which divide the light guide into nine regions.

10. The light guide of claim 1, wherein the at least one edge surface is provided with a reflector to reflect light incident upon the edge surface back into the light guide.

11. A detector comprising:
    an array of detector crystals, wherein each detector crystal receives radiation and emits photons in response to the radiation; and
    a light guide, optically coupled to the array of detector crystals, the light guide comprising
        a first surface which receives the photons from the array of detector crystals,
        a second surface, parallel to the first surface, which emits photons,
        at least one slanted edge surface which extends between the first surface and the second surface; and
        a light barrier which divides the light guide into separate regions and reduces the propagation of light between the separate regions;
    wherein the number of separate regions of the light barrier is less than the number of detector crystals of the array.

12. The detector of claim 11, further comprising an array of photomultipliers which receive light from the light guide.

13. The detector of claim 12, wherein the array of photomultipliers has a receiving area which is larger than an area of the second surface of the light guide.

14. The detector of claim 11, wherein none of the detector crystals in the array of detector crystals is optically glued to another detector crystal in the array of detector crystals.

15. The detector of claim 11, wherein the array of detector crystals comprises a multi crystal array.

16. The detector of claim 15, wherein:
a first detector crystal is wrapped in Teflon tape;
a second detector crystal has a polished inner surface and a polished outer surface;
a third detector crystal has a polished inner surface and a polished outer surface; and
a fourth detector crystal has an inner surface with a surface roughness of 40 microns and an outer surface with a surface roughness of 40 microns.

17. The detector of claim 11, wherein the detector crystals comprise lutetium based scintillator crystals.

18. The detector of claim 11, wherein the detector is adapted to receive gamma rays in a positron emission tomography scanner.

19. A method of making a detector comprising the steps of:
assembling a plurality of detector crystals into an array; and
optically coupling the detector crystals to a light guide, wherein the light guide comprises a first surface which receives light; a second surface which emits light, wherein the second surface is parallel to the first surface and the second surface has a smaller area than the first surface; at least one edge surface which extends between the first surface and the second surface; and a light barrier which extends between the first surface and the second surface, wherein the light barrier divides the light guide into separate regions and reduces the propagation of light between the separate regions;
wherein the number of separate regions of the light barrier is less than the number of detector crystals of the array.

20. The method of claim 19, wherein the plurality of detector crystals are assembled into the array without optically gluing any detector crystal to any other detector crystal.

21. The detector of claim 15, wherein:
at least one detector crystal is wrapped in a light reflector;
at least one detector crystal has a polished surface; and
at least one detector crystal has a roughened surface.

22. A detector comprising:
an array of detector crystals, wherein each detector crystal receives radiation and emits photons in response to the radiation; and
a light guide, optically coupled to the array of detector crystals, the light guide comprising
a first surface which receives the photons from the array of detector crystals,
a second surface, parallel to the first surface, which emits photons,
at least one edge surface which extends between the first surface and the second surface; and
a light barrier which divides the light guide into separate regions and reduces the propagation of light between the separate regions, wherein the number of separate regions of the light barrier is less than the number of detector crystals of the array.

* * * * *